US008850926B2

(12) United States Patent
Bruggemann et al.

(10) Patent No.: US 8,850,926 B2
(45) Date of Patent: Oct. 7, 2014

(54) MOTOR BIKE FOOT PEGS (76) Inventors: Byron Bruggemann, Gin Gin (AU);
Chris Tuckett, Bungadoo (AU)

(*) Notice: Subject to any disclaimer, the term of this patent is extended or adjusted under 35 U.S.C. 154(b) by 0 days.

(21) Appl. No.: 13/497,455

(22) PCT Filed: Sep. 16, 2010

(86) PCT No.: PCT/AU2010/001200
§ 371 (c)(1),
(2), (4) Date: Mar. 21, 2012

(87) PCT Pub. No.: WO2011/035365
PCT Pub. Date: Mar. 31, 2011

(65) Prior Publication Data
US 2012/0274045 A1  Nov. 1, 2012

(30) Foreign Application Priority Data

Sep. 24, 2009 (AU) ................................ 2009904641
Apr. 8, 2010 (AU) ................................ 2010901498

(51) Int. Cl.
*B62H 1/08* (2006.01)
*B62J 25/00* (2006.01)
(52) U.S. Cl.
CPC ....................................... B62J 25/00 (2013.01)
USPC ......................................................... 74/564

(58) Field of Classification Search
USPC .............................. 280/291; 74/564; D12/125
See application file for complete search history.

(56) References Cited

U.S. PATENT DOCUMENTS

| D282,652 S | * | 2/1986 | Nista ........................... D12/125 |
| 6,161,859 A | | 12/2000 | Cheng |
| 2007/0289404 A1 | | 12/2007 | Smith |
| 2009/0008170 A1 | | 1/2009 | Claussen |

OTHER PUBLICATIONS

1) International Search Report, completed Nov. 10, 2010 by the Australian Patent Office.

* cited by examiner

*Primary Examiner* — Kevin Hurley
(74) *Attorney, Agent, or Firm* — Abelman, Frayne & Schwab (57) ABSTRACT

A bike peg including:
a foot rest having an arch portion, a heel portion extending rearward from the arch portion and a forward portion extending forward from the arch portion, the arch portion being adapted to engage the arch portion of a rider's boot during normal motocross travel, the heel portion being adapted to engage the heel portion of the rider's boot in normal motocross travel at least upon the rider's boot pivoting backwards about the arch portion and the forward portion being adapted to engage the arch portion of the rider's boot at least when the rider's foot moves forward to operate the foot brake or gear pedal of the bike.

12 Claims, 11 Drawing Sheets

MOTOR BIKE FOOT PEGS

RELATED CASES AND PRIORITY CLAIM

Applicants claim priority under 35 U.S.C. Sections 119, 120 and/or 365 on AU 2009/904641 filed 24 Sep. 2009 and PCT/AU2010/001200 filed 16 Sep. 2010.

FIELD OF THE INVENTION

This invention relates to motor bike foot pegs.

The invention has particular application to motor bikes of the type used in motocross sports and reference will be made specifically to such application. However, the invention also has application to motor bikes used for other sports and recreation, for example, off road bikes, dirt bikes and endurance bikes, and it may also have application to other bikes.

BACKGROUND OF THE INVENTION

The foot pegs used in motocross bikes typically have a frame with integrally formed teeth thereon which are adapted to engage with the soles of the rider's boots. Typically, the tips of the teeth lie in a fixed plane relative to the bike frame, the fixed plane in use being substantially horizontal when the bike is fully upright, although in some cases it may be inclined forwards or backwards and upwards or downwards towards the frame from horizontal.

In normal motocross travel, the arch portion of each of the rider's boots (typically the centre portion) engages the teeth of the peg but when the rider applies the brake pedal, the brake foot moves forward on the peg and the portion of the sole immediately adjacent the heel (and even part of the heel in some cases) rests on the teeth with the balls of the feet not being supported by the pegs. Similar actions occur with the gear pedal and the other foot. Additionally, in some motocross manoeuvres, one or the other or even both of the rider's feet can move back so that the ball portions of the feet engage the teeth of their respective pegs. In such position, the presently known pegs do not support the rider's heels. Consequently, in both the normal travel position and the braking position or gear changing position, the rider does not have as much control of his feet as desired nor as much control of the bike as desired.

The inventor has found that a rider can maintain better control of his feet by using a bike peg which provides support for the heels of the rider's feet in normal motocross travel and that better control when braking or changing gears can also be achieved using a bike peg which provides support for the balls of the rider's feet when braking or changing gears.

SUMMARY OF THE INVENTION

With the foregoing in view, the invention in one aspect resides broadly in a bike peg including:

a foot rest having an arch portion, a heel portion extending rearward from the arch portion and a forward portion extending forward from the arch portion, the arch portion being adapted to engage the arch portion of a rider's boot during normal motocross travel, the heel portion being adapted to engage the heel portion of the rider's boot in normal motocross travel at least upon the rider's boot pivoting backwards about the arch portion and the forward portion being adapted to engage the arch portion of the rider's boot at least when the rider's foot moves forward to operate the foot brake or gear pedal of the bike.

In another aspect, the invention resides broadly in a bike peg including:

a foot rest having an arch portion and a heel portion extending rearward from the arch portion, the arch portion being adapted to engage the arch portion of a rider's boot during normal motocross travel and the heel portion being adapted to engage the heel portion of the rider's boot in normal motocross travel at least upon the rider's boot pivoting backwards about the arch portion.

In another aspect, the invention resides broadly in a bike peg including:

a foot rest having an arch portion and a forward portion extending forward from the arch portion, the arch portion being adapted to engage the arch portion of a rider's boot during normal motocross travel and the forward portion being adapted to engage the arch portion of the rider's boot at least when the rider's foot moves forward to operate the foot brake or gear pedal of the bike.

It will be appreciated that motocross riders wear specialised safety boots. Typically, the underside of the soles of those boots forward of the heel is generally flat, that is below the arch and the ball of the wearers foot and the underside of the heel is also generally flat but lies in a plane slightly below the underside of the forward part of the sole in normal standing use. Some such boots have a step dividing the heel and the forward part while others have a transition portion with an inclined underside contiguous with the underside of the heel and the forward part. With that in view, it is preferred that the arch portion of the bike peg be made so as to engage the flat underside of the arch portion of the sole. It is also preferred that the heel portion be made so as to engage the flat underside of the heel when the heel is pivoted backwards about the arch portion. In a preferred form, the arch portion, the heel portion and the forward portion each have a plurality of teeth adapted to engage the underside of the relevant portions of the boot sole with the tips of the teeth in the arch portion lying substantially in one plane while the tips of the teeth in the heel portion lie in another plane inclined backwards from the arch plane or in a plane below that of the arch portion, and those in the forward portion lie in another plane inclined forwards from the arch plane or a plane below that of the arch portion.

BRIEF DESCRIPTION OF THE INVENTION

In order that the invention may be more easily understood and put into practical effect, reference will now be made to the accompanying drawings wherein:

FIG. 12 is an outside elevation of the right hand pedal of FIG. 10a; and

DETAILED DESCRIPTION OF THE DRAWINGS

The bike peg 10 illustrated in the drawings includes a foot rest 11 comprising a substantially rectangular perimeter frame member 12 with four cross members 13, 14, 15 and 16 extending from one side to the other and corner bracing members 17, 18, 19 and 20 which interconnect various ones of the cross members and the perimeter member. A mounting block 22 extends from the foot rest portion from one side of the perimeter frame member and is formed integrally with the foot rest for connecting the foot rest to a complementary mount on the bike frame. For that purpose, the mounting block has two spaced apart lugs 23 with aligned holes 24 therein through which a pivot pin 25 passes to connect the bike peg to the bike frame 26. It will be appreciated that the bike pegs can be manufactured with different mounting blocks to suit the particular bike to which they are to be fitted. In that respect, some bike pegs may be provided with an integral pin adapted to fit in a socket of the bike frame rather than receive a pivot pin as described.

Figure 1:
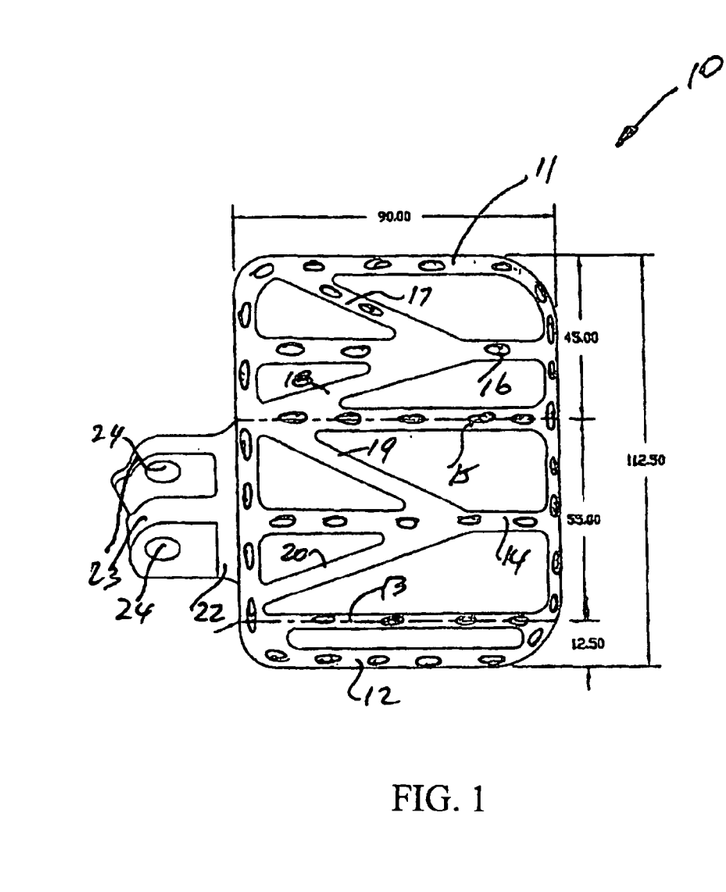
FIG. 1 is a plan of a bike peg according to the invention.
Figure 2:
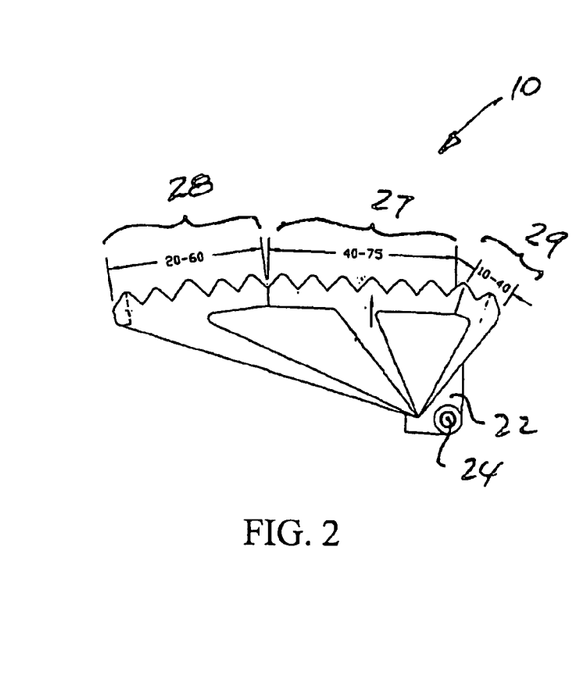
FIG. 2 is a side elevation of the bike peg of FIG. 1.
Figure 3:
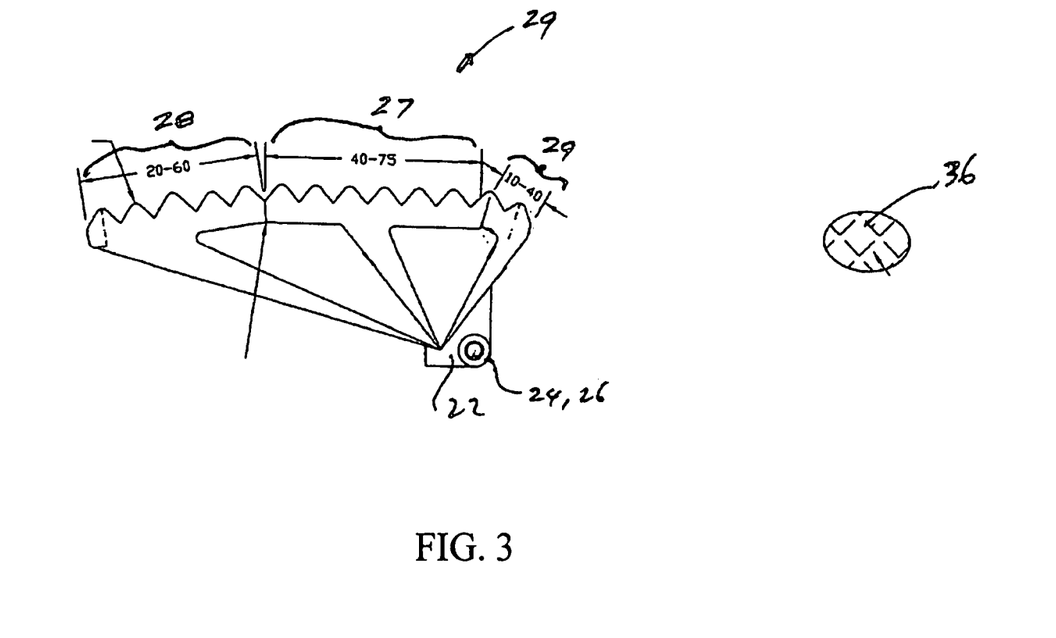
FIG. 3 is a schematic side elevation of a portion of a bike showing the bike peg of FIG. 1 and its relationship with the gear pedal.
Figure 4:
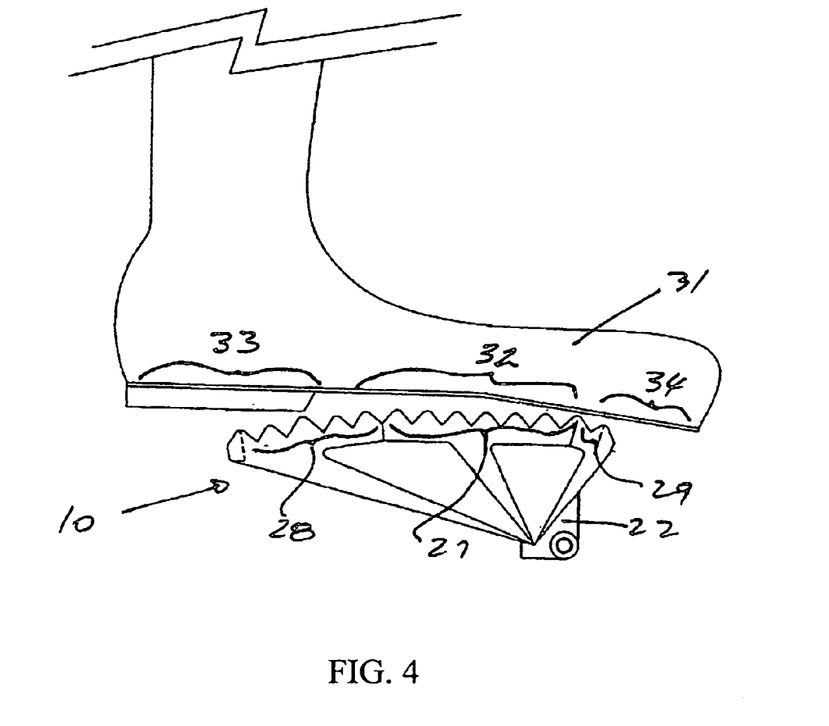
FIG. 4 is the same side elevation as in FIG. 3 (without the gear pedal shown) with a rider's boot resting on the peg in the normal motocross travel position.
Figure 5:
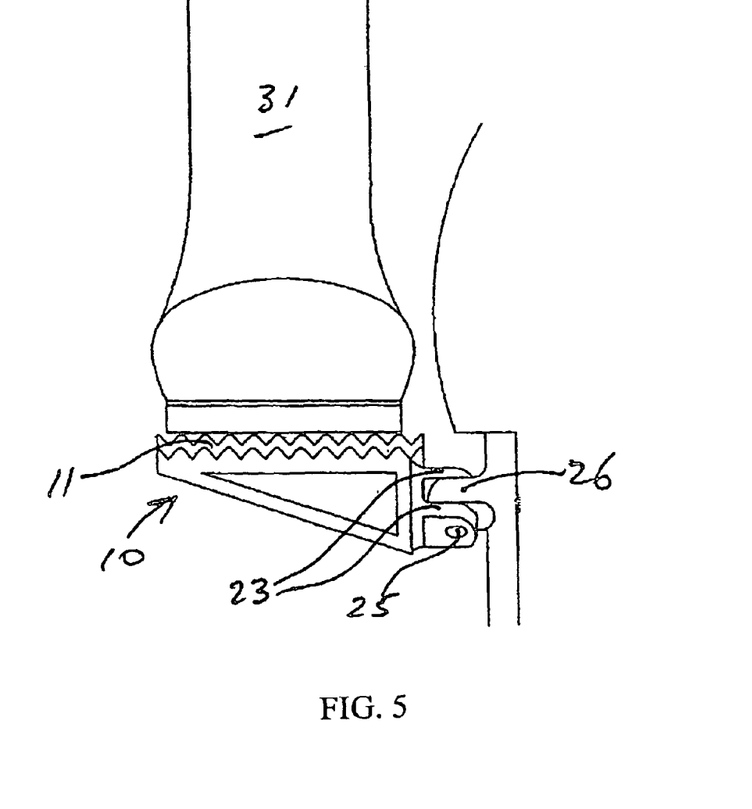
FIG. 5 is a front elevation of the bike portion of FIG. 4 with the rider's boot resting on the peg in the normal motocross travel position.
Figure 6:
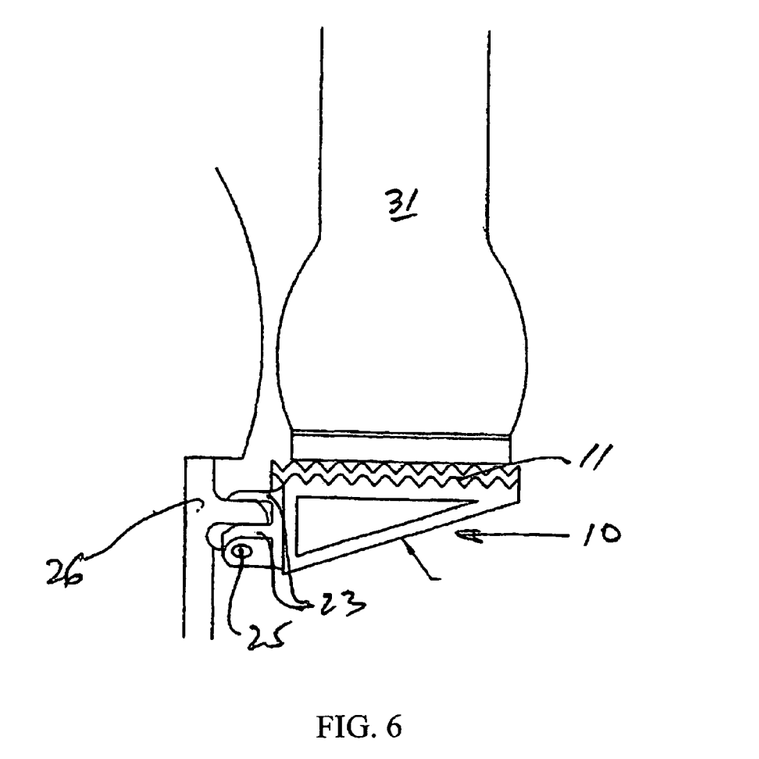
FIG. 6 is a rear elevation of the bike portion of FIG. 4 with the rider's boot resting on the peg in the normal. motocross travel position.

As can be seen in FIG. 2, the foot rest 11 comprises three sections, a middle section (or arch portion) 27, a rear section (or heel portion) 28 and a toe section (or forward portion) 29. Suitably, as can been seen in FIG. 4, in normal motor cross travel, the rider's boot 31 rests on the foot rest portion with the arch portion of the boot resting on the arch portion of the foot rest (shown slightly above the foot rest in the drawing for clarity) with the heel 33 resting in the middle of the heel portion and the toe section of the rider's boot riding freely over or in front of the forward portion of the foot rest. In this case, the forward portion makes an angle of about 40 degrees from horizontal taken through the arch portion while the heel portion makes an angle of about 10 degrees although it could be up to 50 degrees in some cases.

Figure 7:
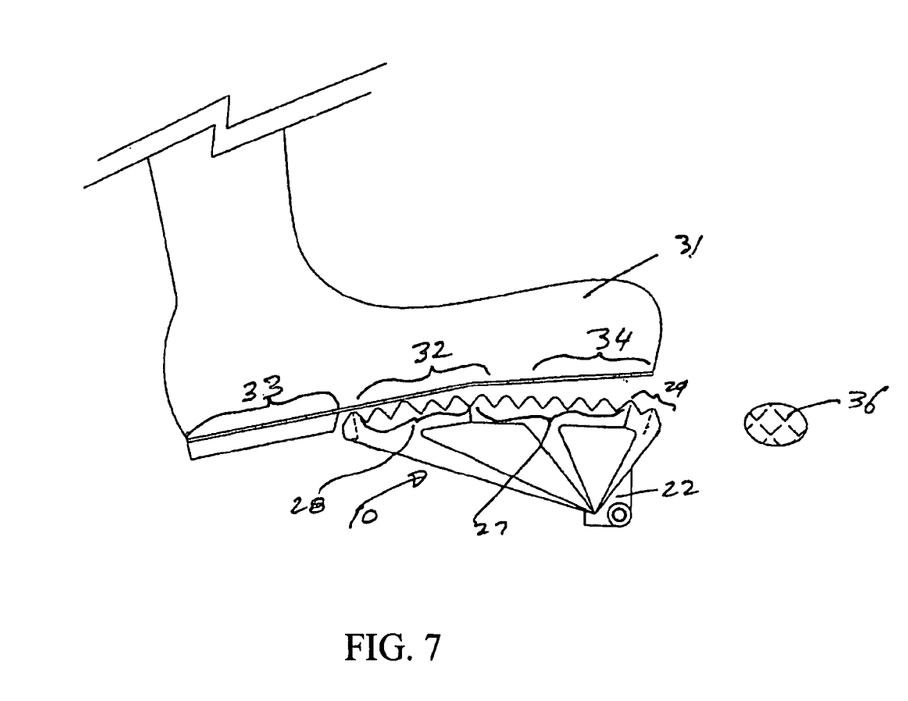
FIG. 7 is another side elevation corresponding to FIG. 3 with the rider's boot on the back part of the peg.

As can be seen in FIG. 7, when the rider's foot is moved rearwards, the arch of the boot is fully supported on the heel portion of the foot rest with the heel resting freely beyond the foot rest and the toe portion of the boot riding above the arch portion of the foot rest. In that position, the arch of the rider's boot takes the rider's weight and maintains rider comfort and stability whereas with other bike pegs the rider's weight would have to be supported by the toe portion engaging with the bike peg.

Figure 8:
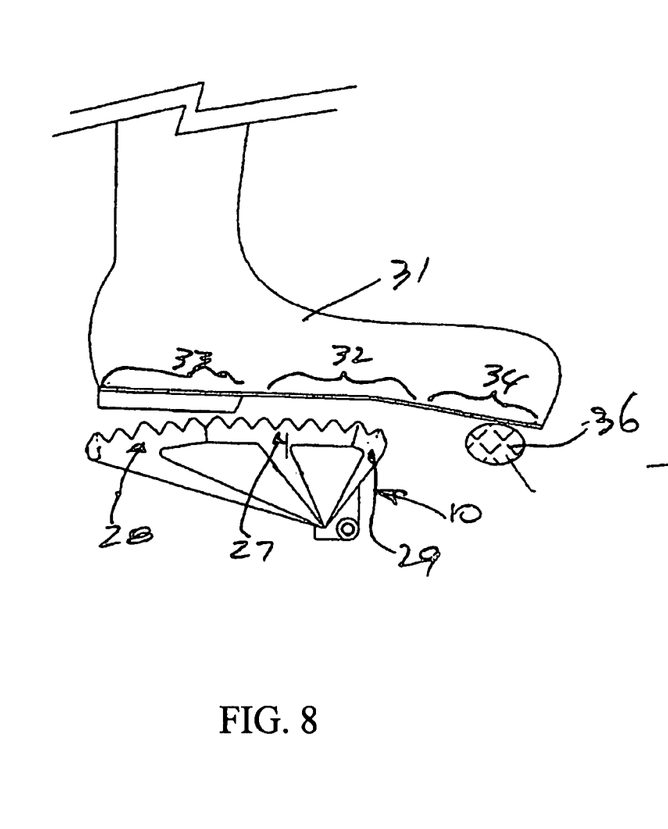
FIG. 8 is another elevation corresponding to FIG. 3 with the rider's boot forward on the bike peg in position for moving the gear pedal down.
Figure 9:
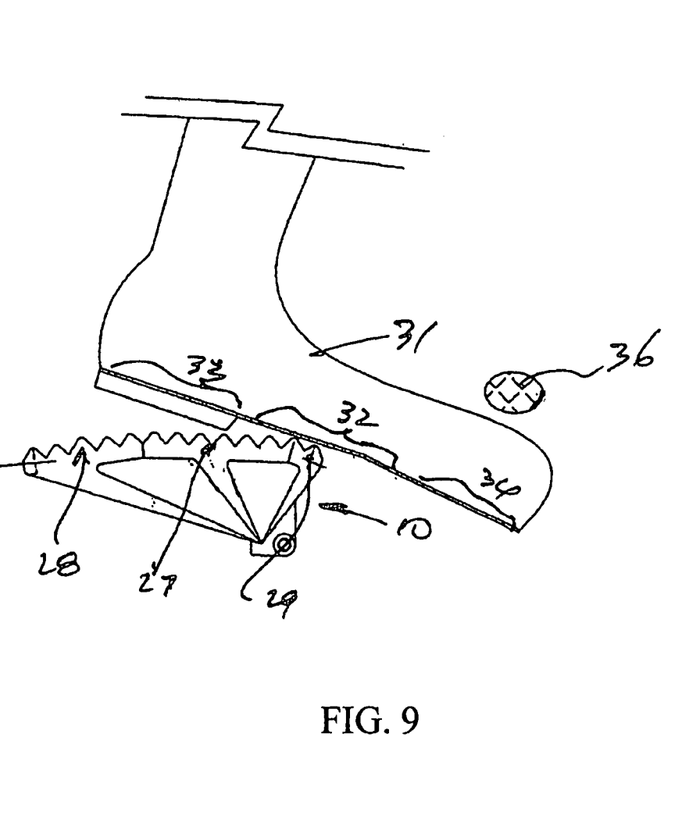
FIG. 9 is another elevation corresponding to FIG. 3 with the rider's boot moved further forward and in position for moving the gear pedal upwards.

Turning now to FIGS. 8 and 9, it can be seen that when the rider's foot is moved forward to shift the gear pedal 36 down (or in the case of a brake pedal to press the brake pedal down), the boot moves forward on the foot rest so that the heel is at least partially supported by the arch portion of the foot rest and the toe portion of the boot rests on the gear pedal, again ensuring that the rider has solid foot support in that position. Similarly, as can be seen in FIG. 9, when the rider moves his foot further forward with the toe of the boot under the gear pedal for lifting the gear pedal upwards, the arch portion of the boot is supported on the forward portion of the foot rest and the rider can rock his foot (and boot) back about the forward portion of the foot rest.

The length of the respective arch portion, heel portion and forward portion in the direction of travel can be varied to suit boot sizes. For example, a peg with an arch length of 40 mm, a heel length of 20 mm and a forward length of 10 mm would suit a small junior boot while one with an arch length of 75 mm, a heel length of 60 mm and a forward length of 40 mm would suit a full size boot.

Figure 10A:
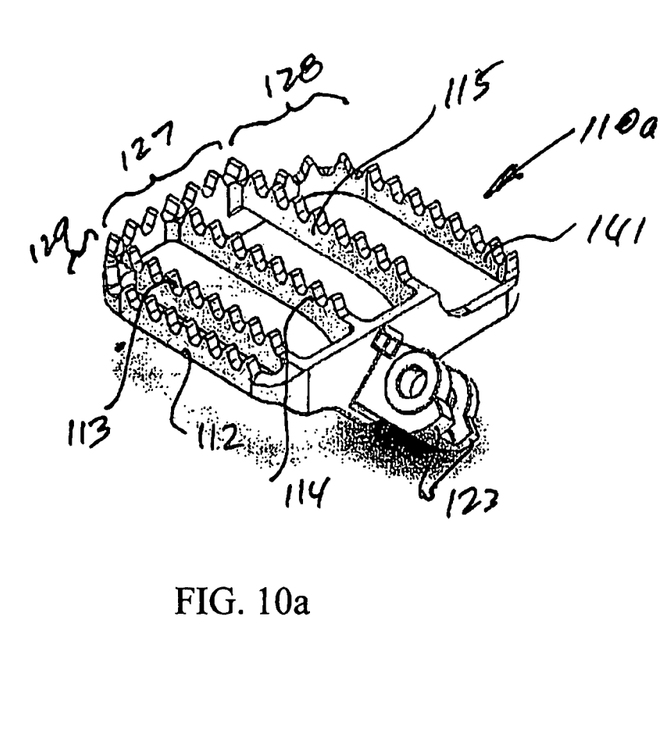
FIGS. 10a and 10b are isometric views of another set of counterpart right and left hand pedals according to the invention.
Figure 10B:
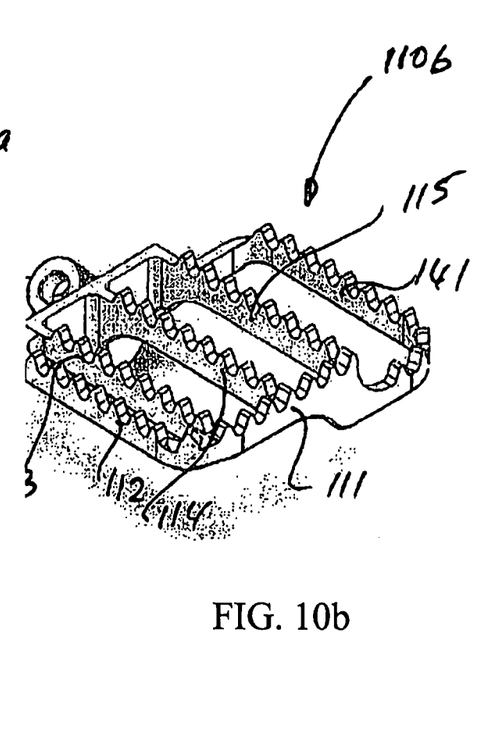
Figures 11A, 11B:
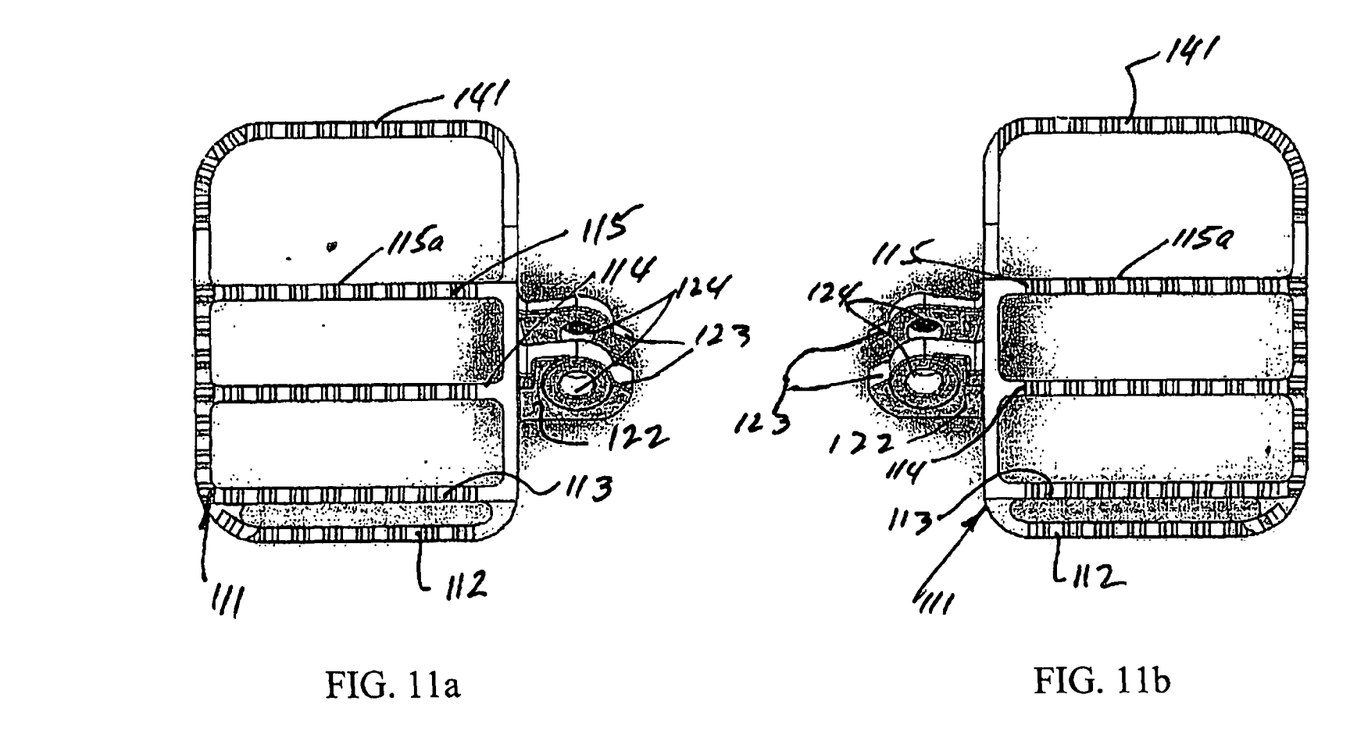
FIGS. 11a and 11b are top plan views of the right and left hand bike pegs of FIGS. 10a and 10b respectively.

The alternative pedals 110a and 110b illustrated in FIGS. 10a and 10b (sometimes referred to simply as pedal 110) are the same as left and right hand pedals 10 in many respects and accordingly corresponding numbers are used to reference corresponding features where appropriate except prefaced by a "1".

The bike peg 110 illustrated in FIGS. 10a and 10b has a foot rest 111 comprising a substantially rectangular perimeter frame member 112 with only three intermediate cross members 113, 114, and 115 extending from one side to the other and no corner bracing members thereby achieving a lighter pedal. A mounting block 122 extends from the foot rest portion from one side of the perimeter frame member and is formed integrally with the foot rest for connecting the foot rest to a complementary mount on the bike frame as in the previously described pedal.

Figure 12:
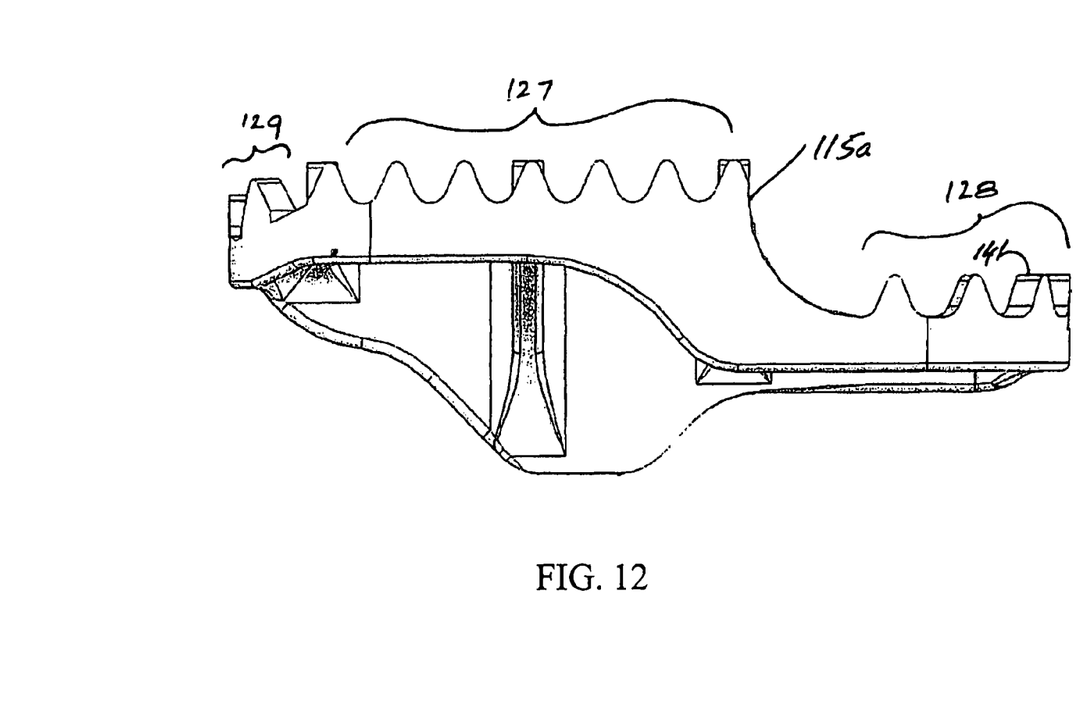
Figure 13:
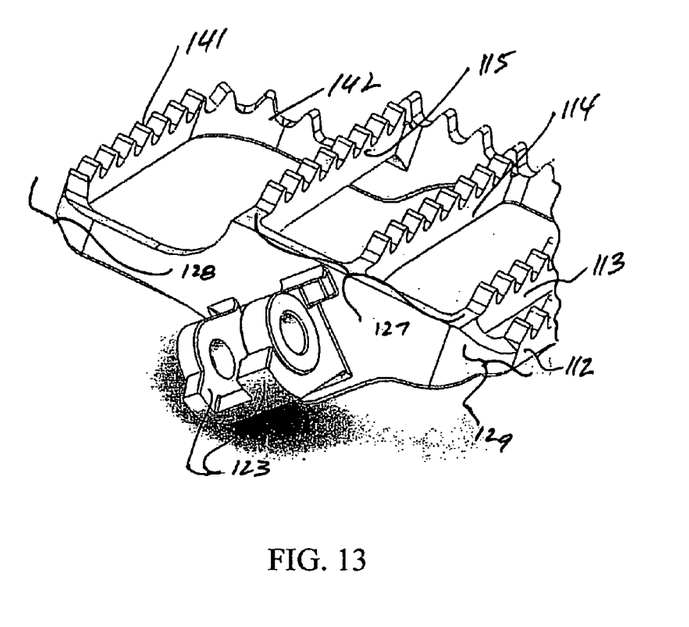
FIG. 13 is an inside isometric view of part of the left hand pedal of FIG. 10b.

As can be seen more clearly in FIGS. 12 and 13, pedal 110 also comprises three footrest sections, a middle section (or arch portion) 127, a rear section (or heel portion) 128 and a toe section (or forward portion) 129. Significantly, the heel portion is wholly stepped down from the arch portion immediately adjacent the rearmost cross member 115 of the arch portion thereby allowing the step down of a rider's boot to engage the rear face 115a of that cross member and the bottom of the boot heel to rest flat on the toothed rear portion of perimeter bar 141 and the toothed side portion 142 thereby giving more rider stability in some actions.

Advantageously, the foot peg illustrated in the drawings provides support for the rider's foot in various positions thereby improving rider comfort and control of the bike with a resulting improvement in rider safety for experienced and inexperienced riders. The foot peg also decreases strain on various parts of the rider's foot and leg and even other parts of the rider's body. It will be appreciated that although the invention has been described with reference to only one foot peg, a bike would normally have complementary bike pegs fitted to both sides for rider comfort and stability, such pairs of bike pegs being mirror images of each other.

The foregoing description has been given by way of illustrative example of the invention and many modifications and variations which will be apparent to persons skilled in the art may be made without departing from the spirit and scope of the invention as defined by the appended claims.

We claim:

1. A bike peg including:
    a foot rest having an arch portion, a heel portion extending rearward from the arch portion and a forward portion extending forward from the arch portion;
    the arch portion having a first array of teeth lying substantially in a first plane for engaging an arch portion of a rider's boot during normal motocross travel;
    the heel portion having a second array of teeth array lying in a second plane wholly stepped down below the height of the teeth in the first array of teeth such that the second plane is substantially parallel to the first plane to provide a step between the first and second planes for engaging a heel portion of the rider's boot in normal motocross travel;

and the forward portion having a third array of teeth lying in a third plane inclined forwards and downwards from the first plane or a plane below the first plane below the height of the teeth in the first array for engaging the arch portion of the rider's boot when the rider's foot moves forward from the arch portion to operate a foot brake or gear pedal of the bike.

2. The bike peg according to claim 1, wherein the second array includes at least one row of teeth.

3. The bike peg according to claim 1, wherein the third array includes at least one row of teeth.

4. The bike peg according to claim 1, wherein said arch portion includes at least two spaced apart arch members and said heel portion includes at least one heel member spaced rearwards from said arch members and said forward portion includes at least one forward member spaced forward from said arch members.

5. The bike peg according to claim 4 wherein said at least two arch members, said at least one heel member and said at least one forward member extend between two spaced apart side members.

6. The bike peg according to claim 4, wherein each of said at least two arch members, said at least one heel member and said at least one forward member include a plurality of upwardly extending teeth.

7. The bike peg according to claim 5, wherein each of said at least two arch members, said at least one heel member and said at least one forward member include a plurality of upwardly extending teeth.

8. The bike peg according to claim 6 wherein at least one of said two spaced apart side members include a plurality of upwardly extending teeth.

9. The bike peg according to claim 7, wherein the tips of the teeth on the side member adjacent the at least one heel member lie substantially in the same plane as the tips of the teeth in the at least one heel member.

10. The bike peg according claim 5, including mounting means extending from one of said side members and adapted to be operatively and releasably connected to the frame of a motocross bike.

11. A bike peg including:
a foot rest having an arch portion and a heel portion extending rearward from the arch portion, the arch portion being adapted to engage the arch portion of a rider's boot during normal motocross travel and the heel portion being wholly stepped downward from the arch portion to extend substantially parallel thereto to provide a step for engaging the heel portion of the rider's boot in normal motocross travel at least upon the rider's boot pivoting backwards about the arch portion.

12. A bike peg including:
a foot rest having an arch portion, a heel portion extending rearward from the arch portion and a forward portion extending forward from the arch portion;
the arch portion having a first array of teeth lying substantially in a first plane for engaging an arch portion of a rider's boot during normal motocross travel;
the heel portion having a second array of teeth array lying in a second plane wholly stepped down below the height of the teeth in the first array of teeth for engaging a heel portion of the rider's boot in normal motocross travel;
and the forward portion having a third array of teeth lying in a third plane inclined forwards and downwards from a plane below the first plane below the height of the teeth in the first array for engaging the arch portion of the rider's boot when the rider' foot moves forward from the arch portion to operate a foot brake or gear pedal of the bike.

* * * * *